US012314954B1

(12) United States Patent
Wang

(10) Patent No.: US 12,314,954 B1
(45) Date of Patent: May 27, 2025

(54) MULTI-FACTOR AUTHENTICATION SYSTEM FOR SELF-SERVICE ENERGY REPLENISHING AND METHOD THEREOF

(71) Applicant: Chih-Chun Wang, Delta (CA)

(72) Inventor: Chih-Chun Wang, Delta (CA)

( * ) Notice: Subject to any disclaimer, the term of this patent is extended or adjusted under 35 U.S.C. 154(b) by 0 days.

(21) Appl. No.: 18/764,391

(22) Filed: Jul. 5, 2024

(51) Int. Cl.
*G06Q 20/40* (2012.01)
(52) U.S. Cl.
CPC .............. *G06Q 20/40145* (2013.01)
(58) Field of Classification Search
None
See application file for complete search history.

(56) References Cited

U.S. PATENT DOCUMENTS

| | | | | |
|---|---|---|---|---|
| 2016/0189158 A1* | 6/2016 | Eramian | ............ | G06Q 20/4014 705/44 |
| 2017/0293982 A1* | 10/2017 | Gupta | ................ | G06Q 20/3224 |
| 2017/0308965 A1* | 10/2017 | Morris | .................. | B67D 7/228 |
| 2018/0276468 A1* | 9/2018 | Lee | ......................... | G06V 40/63 |
| 2019/0389718 A1* | 12/2019 | Patil | .................. | G06Q 20/4014 |
| 2022/0028181 A1 | 1/2022 | Fang | | |
| 2024/0127247 A1 | 4/2024 | Yuki | | |

* cited by examiner

*Primary Examiner* — Peter D Nolan
*Assistant Examiner* — Matthew Cobb
(74) *Attorney, Agent, or Firm* — Winston Hsu

(57) ABSTRACT

The present disclosure provides a multi-factor authentication system for self-service energy replenishing and method thereof. A user may acquire a multi-factor authentication service by an application for experiencing a convenient and safe self-service energy replenishing service. During the registration stage, registration stage upon the user logging into the application of the multi-factor authentication system, the user may complete tasks of identity authentication, account setup (such as obtain a membership of the energy replenishing station), and obtain permission of use for the account, thereby enabling the user to access services provided by the multi-factor authentication service platform. Moreover, during an authentication stage for performing self-service energy replenishing service, the user may obtain the self-service energy replenishing service from the multi-factor authentication service platform in less steps and a much secure manner to improve identity authentication security for the self-service energy replenishing service.

11 Claims, 8 Drawing Sheets

MULTI-FACTOR AUTHENTICATION SYSTEM FOR SELF-SERVICE ENERGY REPLENISHING AND METHOD THEREOF

BACKGROUND OF THE INVENTION

1. Field of the Invention

The invention is related to multi-factor authentication techniques, in particular to a multi-factor authentication system and method for self-service energy replenishing.

2. Description of the Prior Art

Modern energy replenishing stations are mostly equipped with manual energy replenishing driveways and self-service energy replenishing driveways. Through the self-service energy replenishing driveway, a consumer may self-handle energy replenishing by accessing self-service energy replenishing service and conduct credit card payment via a self-service energy replenishing machinery at the energy replenishing apparatus. Therefore, troubles of queuing at the manual energy replenishing driveway may be avoided, time and cost for energy replenishing may be cut down, and convenience for energy replenishing may be achieved.

However, current payment systems for energy replenishing stations can only identify identity of a consumer via credit card, credit card payment personal identification number (PIN), account deposit (e.g., a member account of the consumer at the energy replenishing station) and third-party payment platform, making problems such as password hijack, theft during password authentication, and unauthorized access inevitable.

Based on the above, there is a desperate need in the field to provide a multi-factor authentication system for self-service energy replenishing, which may provide additional identity authentication for the consumer, and increase security during payment via credit card, account deposit or third-party payment for self-service energy replenishing.

SUMMARY OF THE INVENTION

In order to solve the problems listed above, the present invention provides a multi-factor authentication system for self-service energy replenishing having a user device, an energy replenishing station system and a multi-factor authentication service platform. The user device may include an application. The energy replenishing station system may include an image identification device, a biometric device and an energy replenishing apparatus. The energy replenishing station system may include a cloud energy replenishing station server apparatus and a cloud biometric server apparatus. The application may be used to process transaction data and first biometric data, and transmit the transaction data and the first biometric data. The image identification device may be used to acquire vehicle entrance data and transmit the vehicle entrance data. The biometric device may be used to acquire second biometric data of a user, and transmit the second biometric data. The energy replenishing apparatus may have an energy replenishing nozzle and may be used to provide an energy replenishing service, generate an energy-replenishing-service-completed command, and transmit the energy-replenishing-service-completed command. The cloud energy replenishing station server apparatus may be electrically coupled with the user device, the image identification device, and the energy replenishing apparatus, and may be used to: process the transaction data form the user device, and receive and transmit the first biometric data from the user device; process the vehicle entrance data from the image identification device; and process the energy-replenishing-service-completed command from the energy replenishing apparatus. The cloud biometric server apparatus may be electrically coupled with the cloud energy replenishing station server apparatus and the biometric device, and may be used to: process the first biometric data from the cloud energy replenishing station server apparatus, extract a biometric feature according to the first biometric data; and transmit the biometric feature; and process the second biometric data from the biometric device, authenticate the second biometric data to generate user metadata, and transmit the user metadata.

The present invention further provides a multi-factor authentication method for self-service energy replenishing, and the multi-factor authentication method may be performed through a registration stage and an authentication stage. During the registration stage: an user device corresponding to an user logging into an application; the application generating transaction data, and completing an identity authentication for the user; a cloud energy replenishing station server apparatus requesting the user providing first biometric data; the user device extracting the first biometric data of the user, and transmitting the first biometric data to the cloud energy replenishing station server apparatus; the cloud energy replenishing station server apparatus transmitting the first biometric data of the user to a cloud biometric server apparatus; the cloud biometric server apparatus extracting a biometric feature of the first biometric data, transforming the biometric feature into specific vector data, and transforming the specific vector data to the cloud energy replenishing station server apparatus; and the cloud energy replenishing station server apparatus storing the specific vector data and the transaction data corresponding to the specific vector data in a database. During the authentication stage: an image identification device extracting vehicle entrance data of the user, and transmitting the vehicle entrance data to the cloud energy station server apparatus; the cloud energy replenishing station server apparatus executing a vehicle authentication according to the vehicle entrance data to generate a vehicle-authentication-successful event, and transmitting the vehicle-authentication-successful event to the cloud biometric server apparatus; and the cloud biometric server apparatus storing the vehicle-authentication-successful event and the transaction data corresponding to the vehicle-authentication-successful event in a vehicle pool in a vector mode.

Based on the above, the multi-factor authentication system and multi-factor authentication method for self-service energy replenishing of the present invention may reduce existing concerns for security and identity authentication for payment via credit card, account deposit or third-party payment during self-service energy replenishing, and may further provide the following improvements and technical effects:

I. The cloud biometric server apparatus of the multi-factor service platform may encode the biometric data (i.e., the biometric data such as, but not limited to, facial image of the user, for authentication purposes) provided by the user to prevent access from external systems, external devices or external personnel, thereby ensure security of authentication for the user.
 II. The cloud biometric server apparatus of the multi-factor service platform may only extract feature of the biometric data and not store the biometric feature in the database, thereby prevent leakage of security and restricted data during authentication of the user, reduce build cost for the cloud biometric server apparatus of the multi-factor authentication service platform (i.e., the cloud biometric server apparatus may omit arrangement for database for storing the biometric feature), and speed up identity authentication process for the user.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
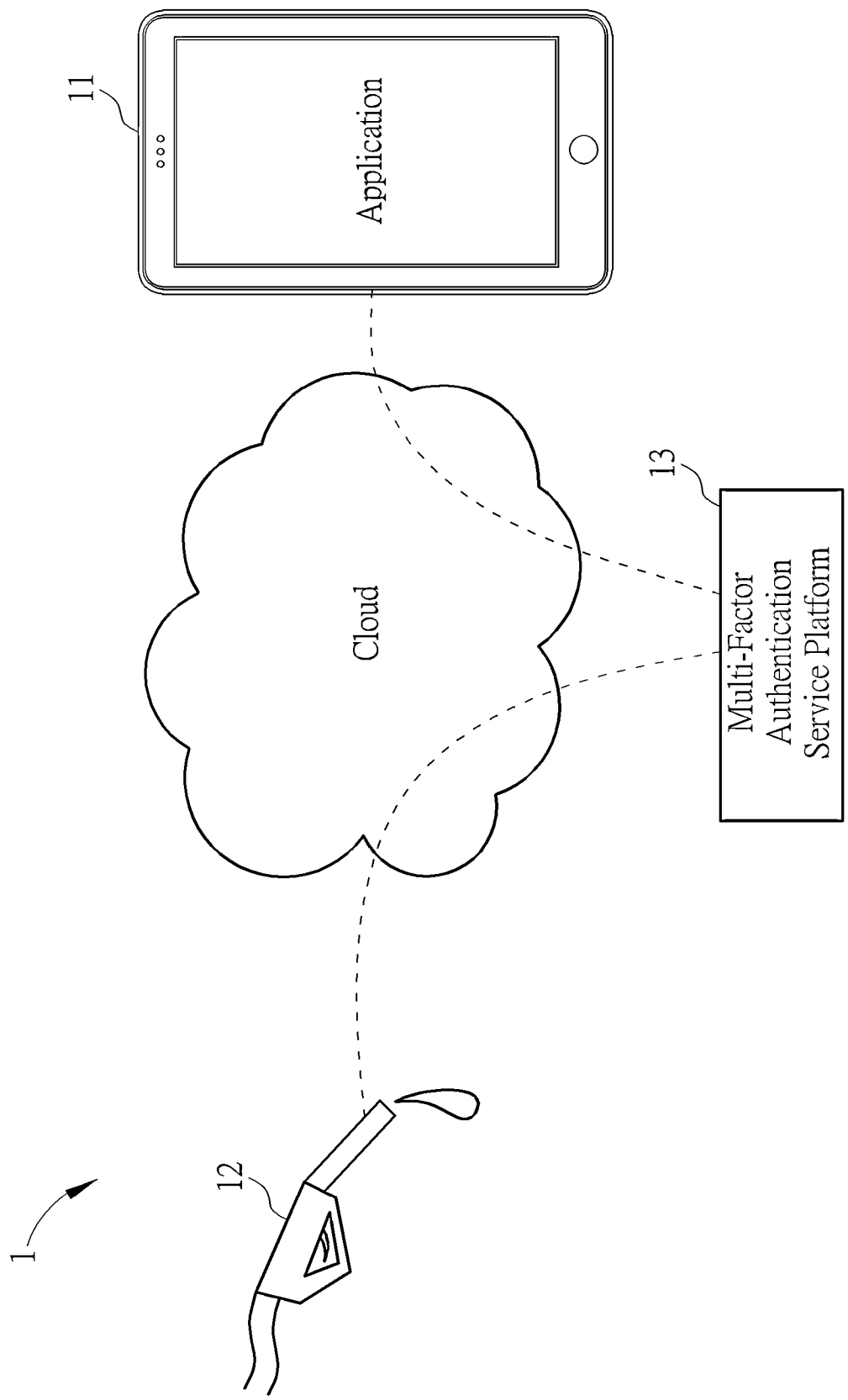
FIG. 1 is a schematic diagram of elements of the multi-factor authentication system for self-service energy replenishing.

Below, exemplary embodiments will be described in detail with reference to accompanying drawings so as to be easily realized by a person having ordinary knowledge in the art. The inventive concept may be embodied in various forms without being limited to the exemplary embodiments set forth herein. Descriptions of well-known parts are omitted for clarity, and like reference numerals refer to like elements throughout.

The orders of drawings shown in accompanying drawings of this disclosure are only used to illustrate embodiments described herein, such that those with ordinary skill in the art can read and understand the present disclosure therefrom, of which are not intended to limit the scope of this disclosure. Any changes, modifications, or adjustments of said features, without affecting the designed purposes and effects of the present disclosure, should all fall within the scope of technical content of this disclosure.

As used herein, when describing an object "comprises," "includes" or "has" a limitation, unless otherwise specified, it may additionally encompass other elements, components, structures, regions, parts, devices, systems, steps, connections, modules, units, etc., and should not exclude others.

As used herein, sequential terms, such as "first," "second," etc., are only cited in convenience of describing or distinguishing limitations such as elements, components, structures, regions, parts, devices, systems, etc. from one another, which are not intended to limit the scope of this disclosure, nor to limit spatial sequences between such limitations. Further, unless otherwise specified, wordings in singular forms such as "a," "an" and "the" also pertain to plural forms, and wordings such as "or" and "and/or" may be used interchangeably.

As used herein, value range may be inclusive and combinable. Any value falls within said value range may act as a maximum value or minimum value for a secondary range. For example, a numeral range for "5 to 20 minutes" may include any secondary range between minimum value of 5 minutes and secondary value of 20 minutes such as 7 to 15 minutes, 16 to 18 minutes or 15 to 20 minutes.

As used herein, the terms "user," "consumer," "driver" and the like may be used interchangeably.

As used herein, the terms "comprise," "include," "have," or any other variations thereof are intended to cover a non-exclusive inclusion. For example, an apparatus, device, module, unit, process or system that comprises a list of elements is not necessarily limited to only those elements, but may include other elements not expressly listed, or inherent to such apparatus, device, module, unit, process or system.

As used herein, the phrase "at least one," in reference to a list of one or more elements, should be understood to mean at least one element selected from any one or more of the elements in the list of elements, but not necessarily including at least one of each and every element listed within the list of elements and not excluding any combinations of elements in the list of elements. This definition also allows that elements may optionally be present other than the elements identified within the list of elements to which the phrase "at least one" refers, whether related or unrelated to those elements identified. Thus, as a non-limiting example, "at least one of A and B" (or, equivalently, "at least one of A or B," or, equivalently, "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements).

As used herein, the term "authentication" may be interchangeable with likes of "confirm," "authorization," "judgment," "determination," "examination," "evaluation," "ratify," "verification," and "inspection." During an event to authenticate a piece of message, data or command, phrases such as "data authentication," "authenticate command," "confirm data," or "confirm command" may be expressed.

As used herein, the phrase "energy replenishing" may refer to gas replenishing, hydrogen replenishing, or electrical energy replenishing; and the term "energy replenishing nozzle" may refer to gas replenishing nozzle, hydrogen replenishing nozzle, electrical energy replenishing nozzle, battery, or battery packs, of which the present invention is not limited thereto. In at least one embodiment of the present invention, a nozzle body of the energy replenishing nozzle may have a hand-held end and an injection end opposing to the hand-held end. To enable energy replenishing, the hand-held end may have a structural shape for a user to hold the energy replenishing nozzle, and the injection end may have a structural shape for injecting into a powered transportation vehicle body. However, the present invention is not meant to be limited by specifications of the energy replenishing nozzle.

As used herein, the term "energy replenishing station" may refer to a gas station, hydrogen replenishing station or electrical energy charging station, of which the present invention is not limited thereto.

As used herein, the term "user device" may refer to a smart phone having imaging functionalities, a tabloid computer having imaging functionalities, a laptop having imaging functionalities, or a wearable electrical device having imaging functionalities, of which the present invention is not limited thereto.

As used herein, the term "transaction data" may refer to identity certificate (such as, but not limited to, token, code or authentication carrier), username, user password, user location, gas type, means of payment, and receipt carrier type, of which the present invention is not limited thereto.

As used herein, the term "identity certificate" may be interchangeable with "token," "verification code," "code," "authentication carrier" or the like.

As used herein, the term "vehicle entrance data" may include, but not limited to, driver's license plate of the user, station name of an energy replenishing station, driveway numeral of the energy replenishing station and/or vehicle entrance time.

As used herein, the term "first biometric data" may refer to biological trait of a user obtained during a registration stage of the user registering with the multi-factor authentication system, and may include facial visual trait of the user, voice trait of the user, fingerprint trait of the user, retinal trait of the user and vein distribution trait on finger of the user, of which the present invention is not limited thereto.

The present invention provides a multi-factor authentication system and a multi-factor authentication method for self-service energy replenishing, where a user (such as, but not limited to, a consumer performing self-service energy replenishing) may acquire multi-factor authentication service via an application (such as an application installed in a user device) to enjoy the self-service energy replenishing service in a convenient and secure manner. During a registration stage upon the user logging into the application of the multi-factor authentication system, the user may complete tasks of identity authentication, account setup (such as obtain a membership of the energy replenishing station), and obtain permission of use for the account, thereby enabling the user to access services provided by the multi-factor authentication service platform. Moreover, during an authentication stage for performing self-service energy replenishing service, the user may obtain the self-service energy replenishing service from the multi-factor authentication service platform in less steps and a much secure manner to improve identity authentication security for the self-service energy replenishing service.

In at least one embodiment of the present invention, the user device may further include: a first data processing unit, being used to generate the transaction data, extract the first biometric data, and transmit the transaction data and the first biometric data; a user device connection unit electrically coupled with the first data processing unit, being used to proceed internet connection for data transmission; and a user device display unit electrically coupled to the user device connection unit, being used to display the transaction data and the first biometric data.

In at least one embodiment of the present invention, the transaction data includes an username, an user password, an user location, a fuel type, a means of payment, and/or a receipt carrier type.

In at least one embodiment of the present invention, the first biometric data may be a biological trait of the user, and the biological trait is obtained during a registration stage of the user registering with the multi-factor authentication system.

In at least one embodiment of the present invention, the image identification device may include: an image data extraction unit, being used to extract the vehicle entrance data; an image data identification unit electrically coupled with the image data extraction unit, being used to identify the vehicle entrance data; and an image identification connection unit electrically coupled with the image data identification unit, being used to provide internet connection for data transmission.

In at least one embodiment of the present invention, the cloud energy replenishing station server apparatus may include: a second data processing unit, being used to: receive the transaction data and the first biometric data from the user device, and transmit the truncation data and the first biometric data; receive the vehicle entrance data from the image identification device, and transmit the vehicle entrance data; receive the biometric feature and the user metadata from the cloud biometric server apparatus, and transmit the biometric feature and the user metadata; and
receive the energy-replenishing-service-completed command from the energy replenishing apparatus; an authentication unit electrically coupled with the second data processing unit, being used to acquire the transaction data, the vehicle entrance data, the biometric feature and the user metadata, authenticate the user device, a vehicle corresponding to the vehicle entrance data, and the user metadata, generate an authentication-successful command for the user device, an authentication-successful command for the vehicle, and an energy-replenishing command, and transmit the authentication-successful command for the user device, the authentication-successful command for the vehicle, and the energy-replenishing command; and a cloud energy replenishing station server apparatus connection unit electrically coupled with the authentication unit, being used to provide internet connection for data transmission.

In at least one embodiment of the present invention, the cloud energy replenishing station server apparatus may further include: a database electrically coupled with the cloud energy replenishing station server apparatus connection unit, being used to store the transaction data, the biometric feature and the vehicle entrance data.

In at least one embodiment of the present invention, the cloud biometric server apparatus may include: a third data processing unit, being used to: receive the first biometric data from the cloud energy replenishing station server apparatus, and generate the biometric feature; receive the authentication-successful command for the vehicle from the cloud energy replenishing station server apparatus; and receive and authentication the second biometric data from the biometric device, generated the user metadata, and transmit the biometric feature and the user metadata; and a cloud biometric server apparatus connection unit electrically coupled with the third data processing unit, being used to provide the internet connection.

In at least one embodiment of the present invention, the biometric device may include: a biometric data extraction unit, being used to extract the second biometric data of the user; and a biometric device connection unit electrically coupled with the biometric data extraction unit, being used to provide internet connection for data transmission.

In at least one embodiment of the present invention, the second biometric data may be a biological trait of the user, the biological trait may be obtained during an authentication stage of the user authenticating with the multi-factor authentication system.

In at least one embodiment of the present invention, the energy replenishing apparatus may include: a fourth data processing unit, being used to receive the energy-replenishing command from the cloud energy replenishing station server apparatus, unlock the energy replenishing nozzle to execute the energy replenishing service according to the energy-replenishing command, generate the energy-replenishing-service-completed command, and transmit the energy-replenishing-service-completed command; and an energy replenishing apparatus connection unit electrically coupled with the fourth data processing unit, being used to provide the internet connection.

In at least one embodiment of the present invention, during the authentication stage: the biometric device may extract second biometric data of the user, and transmitting the second biometric data to the cloud biometric server apparatus; the cloud biometric server apparatus may execute the identity authentication according to the second biometric data; when the identity authentication is successful, the cloud biometric server apparatus may generate an energy-replenishing command and transmit the energy-replenishing command to the energy replenishing apparatus having the energy replenishing nozzle; the energy replenishing apparatus may receive the energy-replenishing command, unlock the energy replenishing nozzle, and execute the energy replenishing service; when the energy replenishing service is completed, the energy replenishing apparatus may generate the energy-replenishing-service-completed command to the cloud energy replenishing station server apparatus; and the cloud energy replenishing station server apparatus may receive the energy-replenishing-service-completed command, and conclude the energy replenishing service.

FIG. 1 is a schematic diagram of elements of the multi-factor authentication system 1 for self-service energy replenishing, the multi-factor authentication system 1 may include: the user device 11, the application to be executed on the user device 11, the energy replenishing station system 12 and the multi-factor authentication service platform 13. The user device 11, the energy replenishing station system 12 and the multi-factor authentication service platform 13 may be connected with each other via any suitable wired or wireless manner, and the present invention is not limited thereto.

In some embodiments, the multi-factor authentication system 1 for self-service energy replenishing of the present invention may, during a registration stage, enable user logging in the application installed on the user device 11, have the application extracting the first biometric data (such as, but not limited to, facial image data) of the user and transmitting the first biometric data to the cloud biometric server apparatus 132 of the multi-factor authentication service platform 13, have the cloud biometric server apparatus 132 transforming the first biometric data (such as, but not limited to, transform the first biometric data into vector data), have the cloud biometric server apparatus 132 storing the transformed first biometric data in the database 1314 of the cloud energy replenishing station server apparatus 131 of the multi-factor authentication service platform 13, and enable the user to perform identity authentication during self-service energy replenishing service provided by the energy replenishing station system 12.

Figure 2:
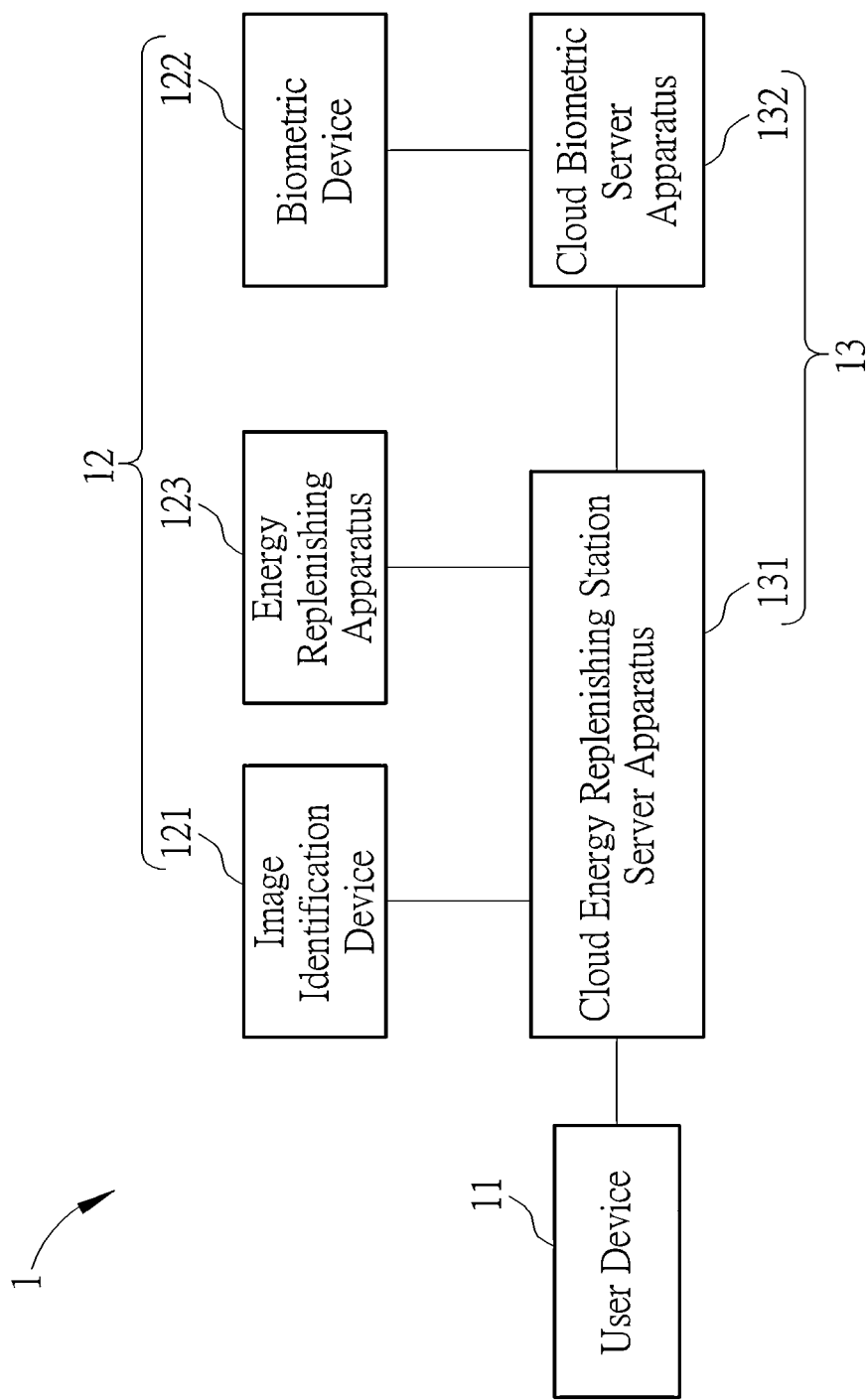
FIG. 2 is a schematic diagram of elements of the user device, the energy replenishing station system and the multi-factor authentication service platform of the multi-factor authentication system 1 for self-service energy replenishing.

FIG. 2 is a schematic diagram of elements of the user device 11, the energy replenishing station system 12 and the multi-factor authentication service platform 13 of the multi-factor authentication system 1 for self-service energy replenishing. The energy replenishing station system 12 may include: the image identification device 121, the biometric device 122, and the energy replenishing apparatus 123. The multi-factor authentication service platform 13 may include: the cloud energy replenishing station server apparatus 131, and the cloud biometric server apparatus 132. The elements of the multi-factor authentication system 1 may be connected with each other via any suitable wired or wireless manner, and the present invention is not limited thereto.

In some embodiments, the user device 11 may be deployed to process the transaction data and the first biometric data during the registration stage of the registering with user the multi-authentication service platform 13. The user device 11 may be realized as a smart phone having imaging functionalities, a tabloid computer having imaging functionalities, a laptop having imaging functionalities, or a wearable electrical device having imaging functionalities, and the present invention is not limited thereto. In some embodiments, the user device 11 may be installed with the application of the multi-factor authentication system 1 for self-service energy replenishing, the transaction data may be stored by the application into the database 1314 via the multi-factor authentication service platform 13 of the present invention, the user may access the imaging functionalities of the user device 11 to acquire the biological trait of the user, and the biological trait of the user may be used for the identity authentication during the self-service energy replenishing.

In some embodiments, the image identification device 121 may be deployed to acquire and identify the vehicle entrance data of the user, transmit the vehicle entrance data to the cloud energy replenishing station server apparatus 131. The vehicle entrance data of the user may be used for vehicle authentication for the user and may be stored in an event file folder at the cloud energy replenishing station server apparatus 131. The image identification device 121 may be realized as a camera or surveillance camera, and the present invention is not limited thereto.

In some embodiments, the biometric device 122 may be deployed to acquire the second biometric data of the user, transmit the second biometric data to the cloud biometric server apparatus 132. The second biometric data may be used for identity authentication for the user. The biometric device 122 may be realized as a camera or surveillance camera, and the present invention is not limited thereto.

In some embodiments, the energy replenishing apparatus 123 may be deployed to receive the energy-replenishing command, and unlock the energy replenishing nozzle for the energy replenishing service.

In some embodiments, the cloud energy replenishing station server apparatus 131 may be deployed to process the transaction data from the user device 11, the vehicle entrance data from the image identification device 121 and the first biometric data from the user device, and execute identity authentication for the user device 11, the vehicle of the user, and the user.

In some embodiments, the cloud biometric server apparatus 132 may be deployed to process the first biometric data from the cloud energy replenishing station server apparatus 131, the vehicle-authentication-successful event from the cloud energy replenishing station server apparatus 131, and the second biometric data from the biometric device 122, and execute identity authentication for the user device 11, the vehicle of the user and the user.

Figure 3:
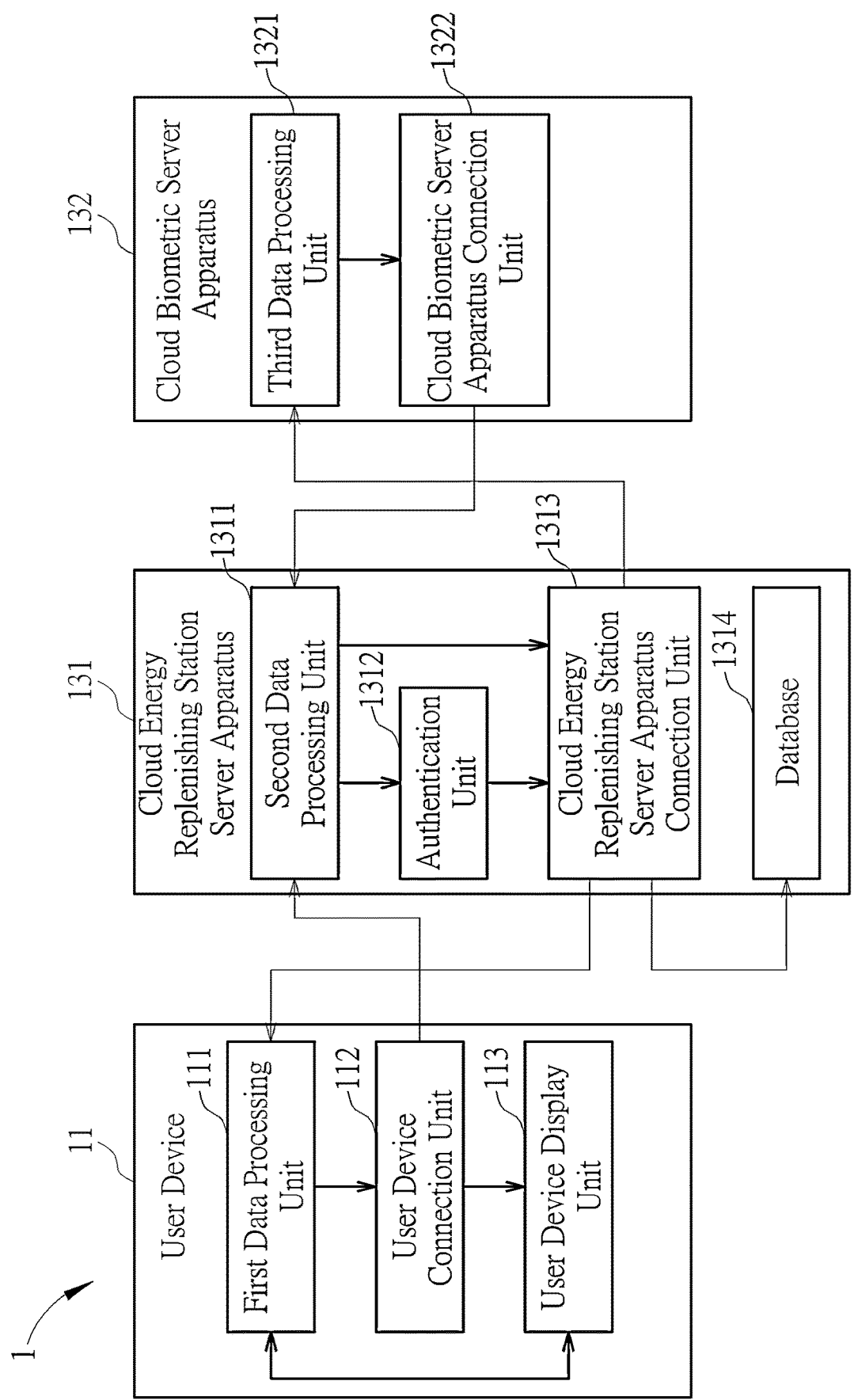
FIG. 3 is a schematic diagram of further elements of the multi-factor authentication system for self-service energy replenishing described in FIG. 2.

FIG. 3 is a schematic diagram of further elements of the multi-factor authentication system 1 for self-service energy replenishing described in FIG. 2. The communication and connection relationships between elements of FIG. 3 may be readily understood through arrows shown in FIG. 3 and the details described below.

In some embodiments, the user device 11 may include the first data processing unit 111, the user device connection unit 112, and the user device display unit 113.

In some embodiments, the first data processing unit 111 may be used to generate the transaction data, acquire the first biometric data, and transmit the transaction data and the first biometric data to the cloud energy replenishing station server apparatus 131. The transaction and the first biometric data may be used for identity authentication, account setup, obtaining permission of use for the multi-factor authentication service platform 13, and identity authentication during self-service energy replenishing. In some embodiments, the user device connection unit 112 may be deployed as an internet connection unit for providing Point-to-Point internet connection, and may be used to transmit the transaction data and the first biometric data. In some embodiments, the user device display unit 113 may be used to display the transaction data and the first biometric data for the user to confirm therefrom.

In some embodiments, the cloud energy replenishing server apparatus 131 may include the second data processing unit 1311, the authentication unit 1312, and the cloud energy replenishing station server apparatus connection unit 1313.

In some embodiments, the cloud energy replenishing station server apparatus 131 may further include the database 1314 for storing the transaction data, the biometric feature and vehicle entrance data. The transaction data, the biometric feature and vehicle entrance data may be used to build the self-service energy replenishing member file folder. The database 1314 may be realized as any suitable data storage device, data storage system, cloud storage space, or the like, and the present invention is not limited thereto.

In some embodiments, the cloud biometric server apparatus 132 may include the third data processing unit 1321 and the cloud biometric server apparatus connection unit 1322.

In some embodiments, the second data processing unit 1311 of the cloud energy replenishing station server apparatus 131 may receive the transaction data from the user device 11, and transmit the transaction data to the authentication unit 1312. The authentication unit 1312 may authenticate the transaction data to identify correctness and security of the transaction data. If the authentication for the transaction data is successful, the user-device-authentication-successful command may be generated and transmitted to the cloud energy replenishing station server apparatus connection unit 1313. The user-device-authentication-successful command may be transmitted by the cloud energy replenishing station server apparatus connection unit 1313 to the user device 11 in request for the first biometric data from the user. Then, the second data processing unit 1311 may receive the first biometric data from the user device 11, and the cloud energy replenishing station server apparatus connection unit 1313 may transmit the first biometric data to the cloud biometric server apparatus 132. Then, the third data processing unit 1321 of the cloud biometric server apparatus 132 may receive the first biometric data to generate the biometric feature, and transmit the biometric feature to the cloud biometric server apparatus connection unit 1322. Then, the cloud biometric server apparatus connection unit 1322 may be realized as the internet connection unit to provide Point-to-Point internet connection, and may transmit the biometric feature to the second data processing unit 1311 of the cloud energy replenishing server apparatus 131. Lastly, the second data processing unit 131 may receive the biometric feature and transmit the biometric feature to the cloud energy replenishing station server apparatus connection unit 1313, and further transmit the biometric feature to the database 1314 for storage.

Figure 4:
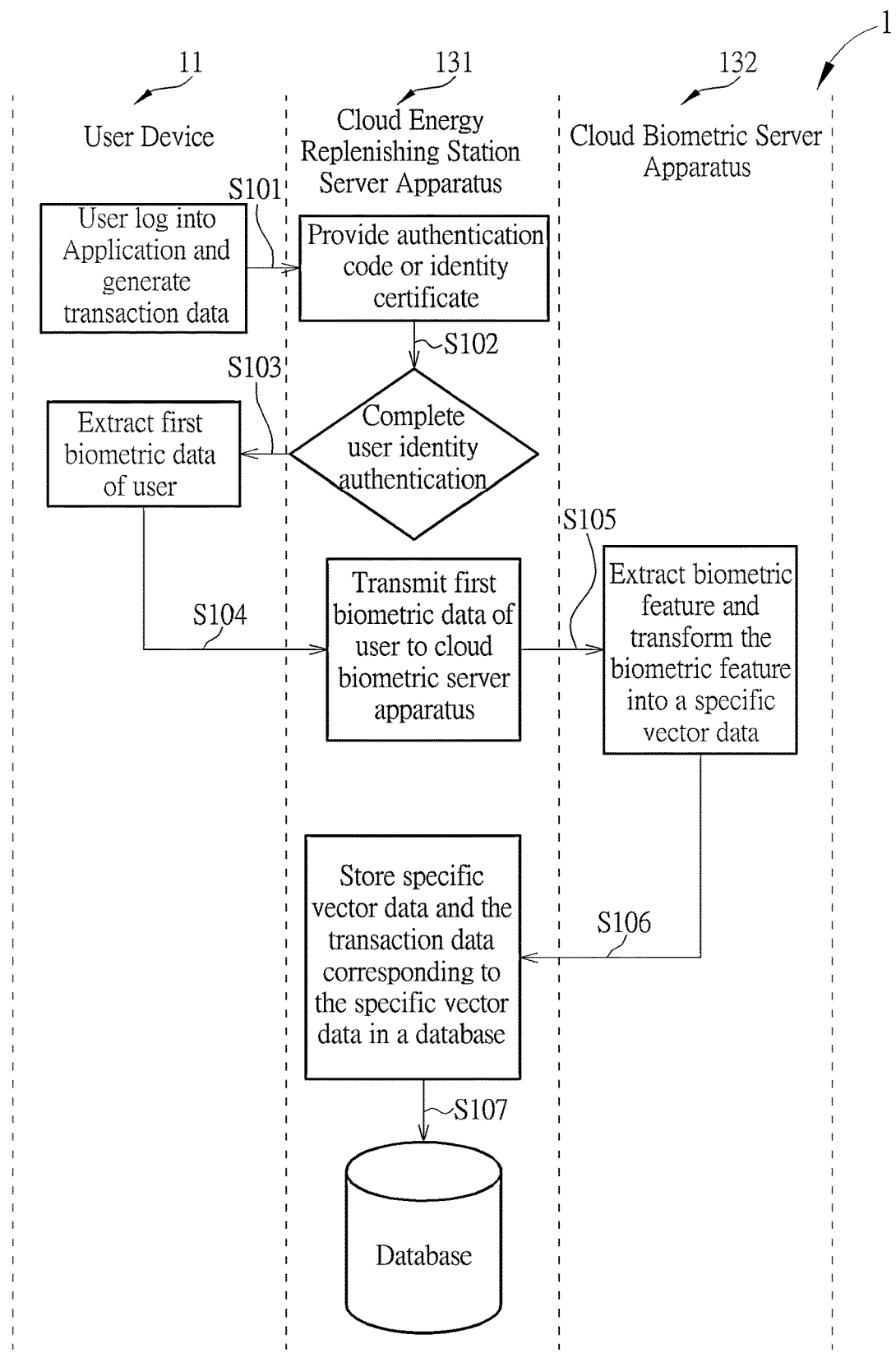
FIG. 4 is a flowchart diagram illustrating the method being deployed on the multi-factor authentication system for self-service energy replenishing, where process flow deployed between the user device, the cloud energy replenishing station server apparatus and the cloud biometric server apparatus is shown.

FIG. 4 is a flowchart diagram illustrating the method being deployed on the multi-factor authentication system 1 for self-service energy replenishing. The process during the registration stage of the method may be readily understood through the arrows indicated in FIG. 4 and the details described below.

In some embodiments, the user may log in the application installed at the user device 11. When identity of the user is authenticated by the cloud energy replenishing station server apparatus 131 of the multi-factor authentication service platform 13, the application may extract the first biometric data of the user and transmit the first biometric data to the cloud biometric server apparatus 132 of the multi-factor authentication service platform 13. Then, the cloud biometric server apparatus 132 may execute transformation of the first biometric data and transmit the first biometric data after transformation to the cloud energy replenishing station server apparatus 131. Lastly, the cloud energy replenishing station server apparatus 131 may store the first biometric data after transformation in the database 1314. The first biometric data after transformation may be used for identity authentication of the user during employment of self-service energy replenishing service provided by the energy replenishing station system. In the embodiments described herein, the user may access the application and transmit the transaction data (such as, but not limited to, username and/or user password) to the cloud energy replenishing station server apparatus 131 (Step S101). Then, the cloud energy replenishing station server apparatus 131 may authenticate the user identity according to the transaction data to generate a token (Step S102). Then, the authentication code corresponding to the token may be provided to the user via interface of the application, and when the authentication is successful, the cloud energy replenishing station server apparatus 131 may redirect the application to a camera-operating interface of the application and request acquisition of the first biometric data (such as, but not limited to, facial image) of the user (Step S103). Then, the application may transmit the first biometric data of the user to the cloud energy replenishing station server apparatus 131 (Step S104). Then, the cloud energy replenishing station server apparatus 131 may transmit the first biometric data to the cloud biometric server apparatus 132 (Step S105). Then, the cloud biometric server apparatus 132 may extract the biometric feature of the first biometric data, transform the biometric feature into a specific vector data, and transmit the specific vector data to the cloud energy replenishing station server apparatus 131 (Step S106). Then, the cloud energy replenishing station server apparatus may store the specific vector data and the transaction data corresponding to the specific vector data in the database 1314 in a vector mode (Step S107). Therefore, the specific vector data and the transaction data corresponding to the specific vector data may be used for identity authentication during self-service energy replenishing of the user. For example, during the identity authentication stage of self-service energy replenishing of the user, the identity authentication may be executed by rapidly lookup or extract a similar vector data point within the database 1314.

In some embodiments, the database 1314 of the present invention may be vector data database and may be used to manage the transaction data, the vehicle entrance data, the first biometric data, the second biometric data, and data accessibility and to enable identity authentication and data search (such as, but not limited to search engine).

In some embodiments, before the first biometric data is being transmitted to the cloud biometric server apparatus 132 by the cloud energy replenishing station server apparatus 131 and/or after the specific vector data is being transmitted to the cloud energy replenishing station server apparatus 131, the cloud biometric server apparatus 132 of the multi-factor authentication service platform 13 may not store the biometric feature being transformed into the specific vector data.

Figure 5:
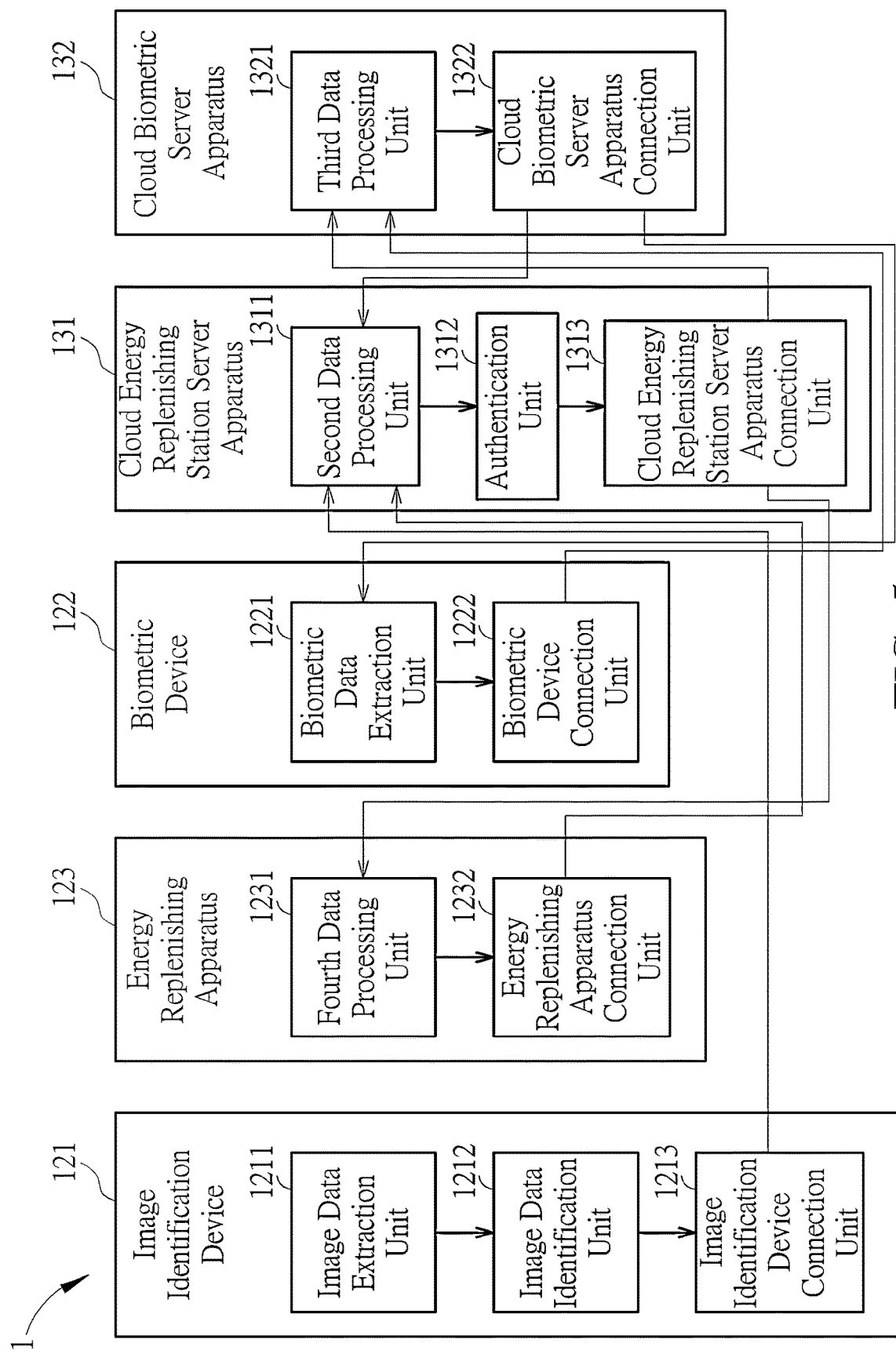
FIG. 5 is a schematic diagram of elements of the multi-factor authentication system for self-service energy replenishing described in FIG. 3, where elements of the image identification device, the energy replenishing apparatus, the biometric device, the cloud energy replenishing station server apparatus and cloud biometric server apparatus is shown.
Figure 6A:
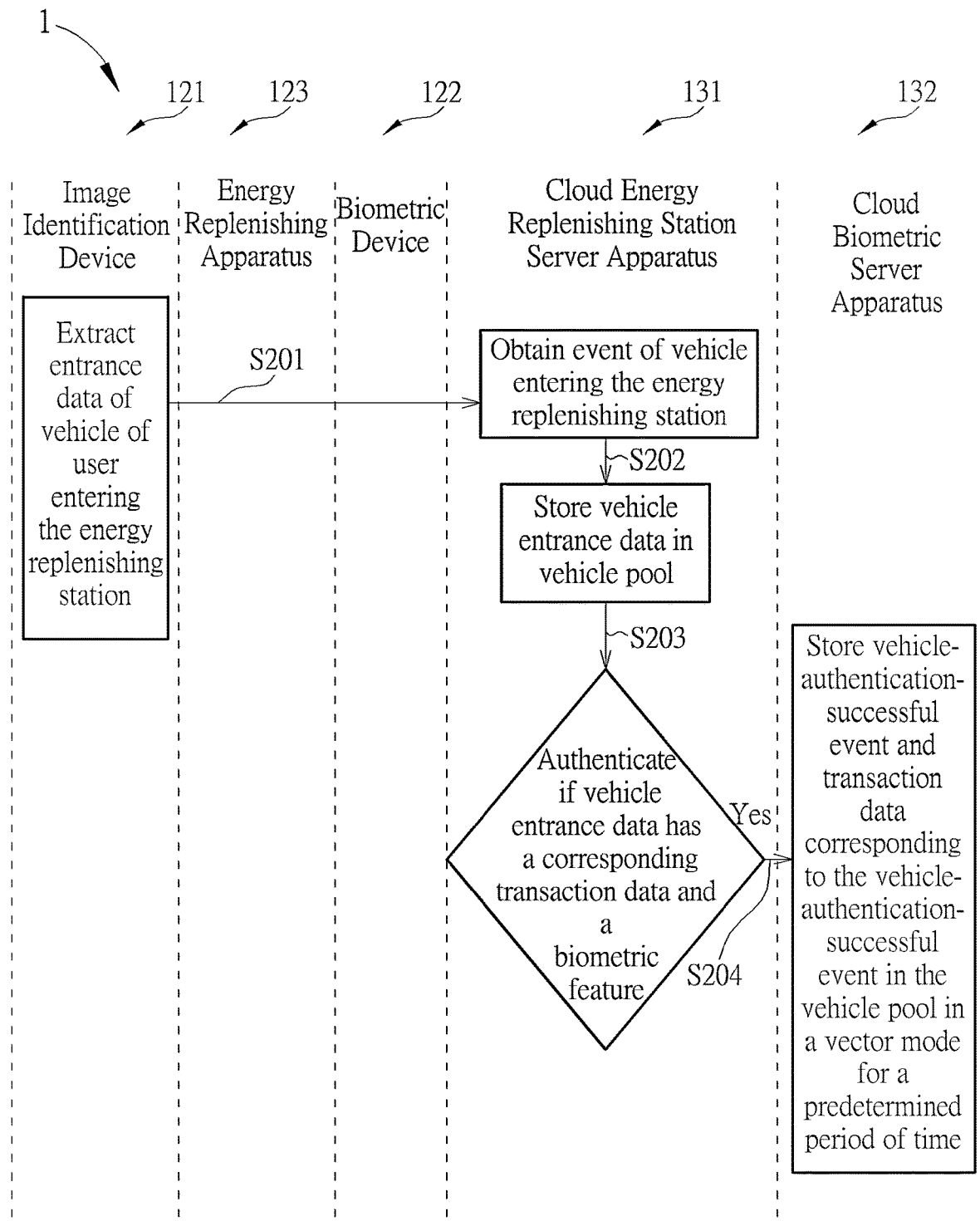
FIG. 6A is a flowchart diagram illustrating the method being deployed on the multi-factor authentication system for self-service energy replenishing, where process flow deployed between the image identification device, the energy replenishing apparatus, the biometric device, the cloud energy replenishing station server apparatus and cloud biometric server apparatus is shown.
Figure 6B:
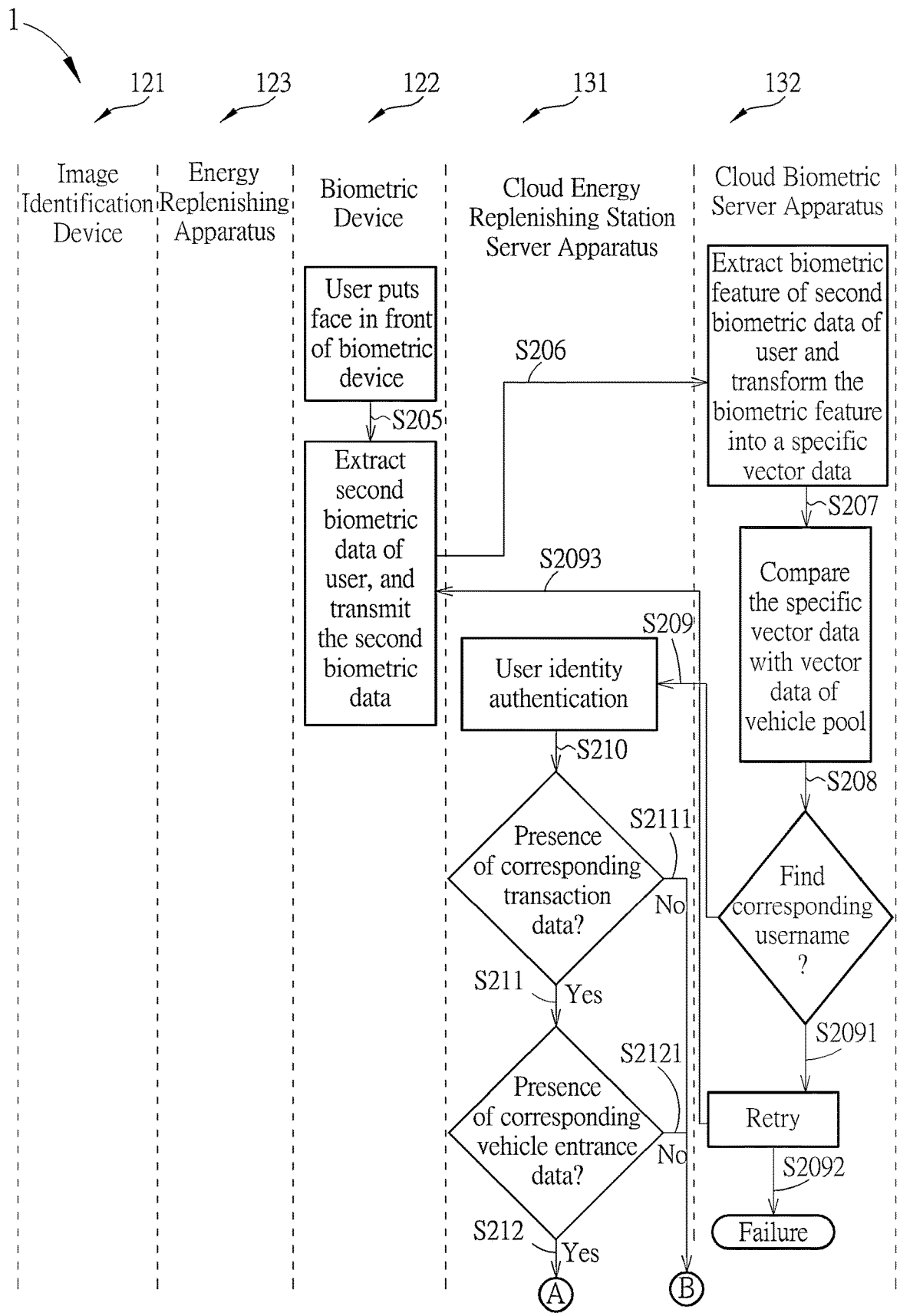
FIG. 6B is a flowchart diagram illustrating the method being deployed on the multi-factor authentication system for self-service energy replenishing, where process flow deployed between the image identification device, the energy replenishing apparatus, the biometric device, the cloud energy replenishing station server apparatus and cloud biometric server apparatus is shown.
Figure 6C:
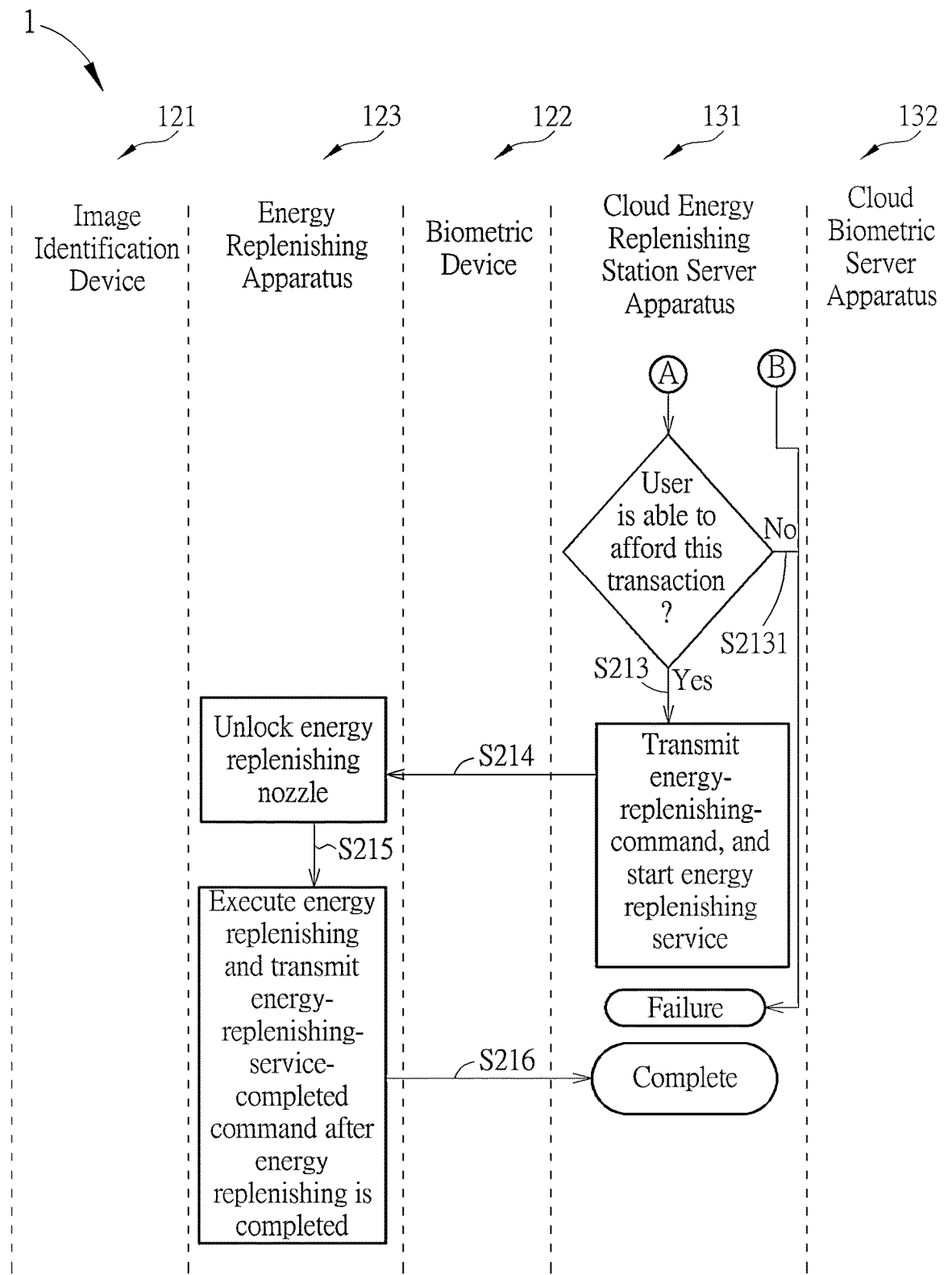
FIG. 6C is a flowchart diagram illustrating the method being deployed on the multi-factor authentication system for self-service energy replenishing, where process flow deployed between the image identification device, the energy replenishing apparatus, the biometric device, the cloud energy replenishing station server apparatus and cloud biometric server apparatus is shown.

FIG. 5 is a schematic diagram of elements of the multi-factor authentication system 1 for self-service energy replenishing described in FIG. 3. The communication and connection relationships between elements of FIG. 5 may be readily understood through arrows shown in FIG. 5. Moreover, FIG. 6A to FIG. 6C are flowchart diagrams illustrating the method being deployed on the multi-factor authentication system 1 for self-service energy replenishing. The process during the authentication stage of the method may be readily understood through the arrows indicated in FIG. 6A to FIG. 6C and the details described below.

In some embodiments, the image identification device 121 may include the image data extraction unit 1211, the image data identification unit 1212, and the image identification device connection unit 1213.

In some embodiments, the image data extraction unit 1211 may be lens of a camera or surveillance camera, and is used to extract the vehicle entrance data and transmit the vehicle entrance data to the image data identification unit 1212. The vehicle entrance data may include driver's license plate of the user, station name of the energy replenishing station, driveway numeral of the energy replenishing station and/or vehicle entrance time. The image data identification unit 1212 may be a processor, and may be used to identify the driver's license plate of the user, the station name of the energy replenishing station, the driveway numeral of the energy replenishing station and/or the vehicle entrance time, and transmit the vehicle entrance data to the image identification device connection unit 1213. The image identification device connection unit 1213 may provide internet connection between the image identification device 121 and the cloud energy replenishing station server apparatus 131, and may be used to transmit the vehicle entrance data to the cloud energy replenishing station server apparatus 131 (Step S201).

In some embodiments, the cloud energy replenishing station server apparatus 131 may include the second data processing unit 1311, the authentication unit 1312 and the cloud energy replenishing station server apparatus connection unit 1313.

In some embodiments, the cloud biometric server apparatus 132 may include the third data processing unit 1321 and the cloud biometric server apparatus connection unit 1322.

In some embodiments, the second data processing unit 1311 of the cloud energy replenishing station server apparatus 131 may be used to receive the vehicle entrance data from the image identification device 121 and store the vehicle entrance data in the vehicle pool (Step S202). The vehicle pool may be used for extraction, transformation, and/or loading of the vehicle entrance data. The extraction, the transformation, and/or the loading of the vehicle entrance data may be used for vehicle authentication for the user. The authentication unit 1312 may extract, transform and/or load the vehicle entrance data stored in the vehicle pool, and transmit the vehicle entrance data to the database 1314 (such as, but not limited to, the vector data database storing the transaction data and the biometric feature of the user as described above). The vehicle entrance data is then analyzed at the database 1314 to confirm presence of the transaction data (such as, but not limited to, the username) and the biometric feature corresponding to vehicle of the user (Step S203). The vehicle-authentication-successful event may be generated and transmitted to the cloud biometric server apparatus 132 when authentication is successful (Step S204). The vehicle-authentication-successful event and the transaction data of the user corresponding to the vehicle-authentication-successful event may be stored in the vehicle pool in a vector mode for a predetermined period of time set by the multi-factor service platform 13.

In some embodiments, the predetermined period of time may range from 5 minutes to 20 minutes, 5 minutes to 15 minutes, 5 minutes to 10 minutes, 10 minutes to 20 minutes, 10 minutes to 15 minutes, 15 minutes to 20 minutes, and may be arranged or adjusted based on requirements of the multi-factor authentication service platform 13, and the present invention is not limited thereto.

In some embodiments, the biometric device 122 may include the biometric data extraction unit 1221 and the biometric device connection unit 1222.

In some embodiments, the energy replenishing apparatus 123 may include the fourth data processing unit 1231 and the energy replenishing apparatus connection unit 1232.

In some embodiments, the biometric data extraction unit 1221 may be a camera or surveillance camera, and may be used to extract the second biometric data of the user (such as, but not limited to, a facial recognition device may be used to obtain facial image of the user before the user obtain access to self-service energy replenishing at the energy replenishing station) (Step S205). The biometric device connection unit 1222 may be used to transmit the second biometric data to the cloud biometric server apparatus 132 (Step S206). The third data processing unit 1321 of the cloud biometric server apparatus 132 may be used to extract the biometric feature from the second biometric data and transform the biometric feature into the vector data (Step S207). The vector data may be compared with data of the vehicle pool in search for the transaction data (such as, but not limited to, the username) of the user corresponding to the biometric feature. When transaction data (such as, but not limited to, the username) of the user corresponding to the biometric feature is present (Step S208), the third data processing unit 1321 may generate the user metadata and transmit the user metadata to the cloud energy replenishing station server apparatus 131 (Step S209). The second data processing unit 1311 of the cloud energy replenishing station server apparatus 131 may be used to receive the user metadata and transmit the user metadata to the authentication unit 1312. The authentication unit 1312 may be used to authenticate the transaction data, the vehicle and payment of the user (Step S210). During authentication, the user metadata may be compared with data of the database 1314 (such as, but not limited to, the vector data database) to identify, such as, but not limited to, presence of username of the transaction data of the user corresponding to the user metadata (Step S211), presence of means of payment of the transaction data of the user corresponding to the user metadata (Step S213) and presence of vehicle entrance data (such as, but not limited to, driver's license plate number) of the user corresponding to the user metadata (Step S212). The authentication unit 1312 may further generate energy-replenishing command after the authentication is completed (Step S214). The energy-replenishing command may be sent by the cloud energy replenishing station server apparatus connection unit 1313 to the energy replenishing apparatus 123. The fourth data processing unit 1231 of the energy replenishing apparatus 123 may be used to receive the energy-replenishing command, unlock the energy replenishing nozzle, provide energy replenishing service for the user (Step and S215), generate the energy-replenishing-service-completed command after the energy replenishing service is completed. The energy-replenishing-service-completed command may be transmitted by the energy replenishing apparatus connection unit 1232 to the cloud energy replenishing station server apparatus 131 to conclude the energy replenishing service (Step S216).

In some other embodiments, the third data processing unit 1321 of the cloud biometric server apparatus 132 may extract the biometric feature of the second biometric data and transform the biometric feature into the vector data (Step S207). The vector data may be compared with data of the vehicle pool to lookup the transaction data (such as, but not limited to, username) of the user corresponding to the biometric feature. If there is no presence of the transaction data of the user corresponding to the vector data (Step S2091), the lookup may be retried several times (Step S2092) or the third data processing unit 1321 may request user to operate the biometric device 122 and extract the second biometric data again (such as, but not limited to, retake facial image of the user) (Step S2093).

In some embodiments, the phrase "the lookup may be retried several times" may refer to the lookup being retried 2 times to 5 times, 2 times to 4 times, 2 times to 3 times, 3 times to 5 times, 3 times to 4 times, 4 times to 5 times, and may be arranged or adjusted based on requirements of the multi-factor authentication service platform 13, and the present invention is not limited thereto.

In some other embodiments, the second data processing unit 1311 of the cloud energy replenishing station server apparatus 131 may be used to receive the user metadata and transmit the user metadata to the authentication unit 1312. The authentication unit 1312 may be used to authenticate the transaction data, the vehicle and payment of the user (Step S210). During authentication, the user metadata may be compared with data of the database 1314 (such as, but not limited to, the vector data database) to identify, such as, but not limited to, presence of username of the transaction data of the user corresponding to the user metadata (Step S211), presence of means of payment of the transaction data of the user corresponding to the user metadata (Step S213) and presence of vehicle entrance data (such as, but not limited to, driver's license plate number) of the user corresponding to the user metadata (Step S212). If the authentication turn out to be failure at the authentication unit 1312, the user will be forbidden from enjoying the self-service energy replenishing service (Step S2111, Step S2121 and Step S2131).

In some embodiments, before the vehicle-authentication-successful event is transmitted to the cloud biometric server apparatus 132 and/or after the vehicle-authentication-successful event and the transaction data of the user corresponding to the vehicle-authentication-successful event are stored at the vehicle pool in vector mode for the predetermined period of time set by the multi-factor authentication service platform 13, the cloud biometric server apparatus 132 of the multi-factor authentication service platform 13 will not store the vehicle entrance data in the vehicle pool. Further, before the second biometric data is transmitted by the biometric device connection unit 1222 to the cloud biometric server apparatus 132 and/or after the user metadata is generated by the third data processing unit 1321 and transmitted by the cloud biometric server apparatus connection unit 1322 to the cloud energy replenishing server apparatus 131, the cloud biometric server apparatus 132 will not store the specific vector data of the second biometric data in the database 1314.

Each unit of FIG. 3 and FIG. 5 may be realized as software, hardware, or firmware. If said unit is software or firmware, the unit may include command executable by a unit, processor, computer or server. If said unit is hardware, the unit may be a module, processor, computer, or server capable of data processing and computing.

In some embodiments, the elements of the multi-factor authentication system 1 for self-service energy replenishing may be respectively realized as any suitable computing device, apparatus, application, system or the like, and the present invention is not limited thereto. In some embodiments, any two or three of the second data processing unit 1311, the authentication unit 1312 and the cloud energy replenishing station server apparatus connection unit 1313 of the cloud energy replenishing station server apparatus 131 may be integrated as one unit instead of being realized as three standalone units. However, without straying away from operational concepts described in the present invention, arrangements of the elements of the multi-factor authentication system 1 may be realized in any suitable formats and should not limit the present invention in any way.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A multi-factor authentication system based on vector comparison for self-service energy replenishing, the multi-factor authentication system comprising a user device, an energy replenishing station system and a multi-factor authentication service platform, wherein:

the user device comprises:

an application, connected to internet and configured to process and transmit first transaction data and first biometric data;

the energy replenishing station system is connected to the internet and comprises:
an image identification device, configured to acquire and transmit vehicle entrance data;
a biometric device, configured to acquire and transmit second biometric data of a user; and
an energy replenishing apparatus having an energy replenishing nozzle, configured to provide an energy replenishing service in response to energy-replenishing command, and generate and transmit an energy-replenishing-service-completed command; and
the multi-factor authentication service platform comprises:
a cloud energy replenishing station server apparatus connected to the internet, and configured to:
provide database for storing transaction data and vector data corresponding to the transaction data;
in response to receiving first vector data, store the first transaction data corresponding to the first vector data from the user device and the first vector data in the database, the first vector data is stored as part of the vector data, the first transaction data is stored as part of the transaction data;
in response to receiving the vehicle entrance data from the image identification device, retrieve the first transaction data corresponding to the first vector data of the vector data according to the vehicle entrance data and store the first transaction data being retrieved in vehicle pool in a vector mode;
transmit the energy-replenishing command when authentication is completed based on user metadata; and
process the energy-replenishing-service-completed command from the energy replenishing apparatus; and
a cloud biometric server apparatus connected to the internet and configured to:
in response to receiving the first biometric data, extract a first biometric feature according to the first biometric data, transform the first biometric feature into the first vector data, and transmit the first vector data; and
in response to receiving the second biometric data, extract a second biometric feature according to the second biometric data, transform the second biometric feature into second vector data, compare the second vector data with data of the vehicle pool in search for the first transaction data corresponding to the first vector data similar to the second vector data, generate the user metadata when the first transaction data is present, and transmit the user metadata.

2. The multi-factor authentication system of claim 1, wherein the user device further comprises:
a first data processing unit, configured to generate the first transaction data, extract the first biometric data, and transmit the first transaction data and the first biometric data;
a user device connection unit electrically coupled with the first data processing unit, configured to proceed internet connection for data transmission; and
a user device display unit electrically coupled to the user device connection unit, configured to display the first transaction data and the first biometric data.

3. The multi-factor authentication system of claim 2, wherein the first transaction data comprises an username, an user password, an user location, a fuel type, a means of payment, and/or a receipt carrier type.

4. The multi-factor authentication system of claim 2, wherein the first biometric data is a biological trait of the user, the biological trait is obtained during a registration stage of the user registering with the multi-factor authentication system.

5. The multi-factor authentication system of claim 1, wherein the image identification device comprises:
an image data extraction unit, configured to extract the vehicle entrance data;
an image data identification unit electrically coupled with the image data extraction unit, configured to identify the vehicle entrance data; and
an image identification connection unit electrically coupled with the image data identification unit, configured to provide internet connection for data transmission.

6. The multi-factor authentication system of claim 1, wherein the cloud energy replenishing station server apparatus comprises:
a second data processing unit, configured to:
receive the first transaction data and the first biometric data from the user device, and transmit the first truncation data and the first biometric data;
receive the vehicle entrance data from the image identification device, and transmit the vehicle entrance data;
receive the first biometric feature and the user metadata from the cloud biometric server apparatus, and transmit the first biometric feature and the user metadata; and
receive the energy-replenishing-service-completed command from the energy replenishing apparatus;
an authentication unit electrically coupled with the second data processing unit, configured to acquire the first transaction data, the vehicle entrance data, the first biometric feature and the user metadata, authenticate the user device, a vehicle corresponding to the vehicle entrance data, and the user metadata, generate an authentication-successful command for the user device, an authentication-successful command for the vehicle, and an energy-replenishing command, and transmit the authentication-successful command for the user device, the authentication-successful command for the vehicle, and the energy-replenishing command; and
a cloud energy replenishing station server apparatus connection unit electrically coupled with the authentication unit, configured to provide internet connection for data transmission.

7. The multi-factor authentication system of claim 6, wherein
the database is electrically coupled with the cloud energy replenishing station server apparatus connection unit, and configured to store the transaction data, the first biometric feature and the vehicle entrance data.

8. The multi-factor authentication system of claim 6, wherein the cloud biometric server apparatus comprises:
a third data processing unit, configured to:
receive the first biometric data from the cloud energy replenishing station server apparatus, and generate the first biometric feature;
receive the authentication-successful command for the vehicle from the cloud energy replenishing station server apparatus; and receive and authenticate the second biometric data from the biometric device, generate the user metadata, and transmit the first biometric feature and the user metadata; and a cloud biometric server apparatus connection unit electrically coupled with the third data processing unit, configured to provide the internet connection.

9. The multi-factor authentication system of claim 1, wherein the biometric device comprises:

a biometric data extraction unit, configured to extract the second biometric data of the user; and a biometric device connection unit electrically coupled with the biometric data extraction unit, configured to provide internet connection for data transmission.

10. The multi-factor authentication system of claim 9, wherein the second biometric data is a biological trait of the user, the biological trait is obtained during an authentication stage of the user authenticating with the multi-factor authentication system.

11. The multi-factor authentication system of claim 6, wherein the energy replenishing apparatus comprises:

a fourth data processing unit, configured to receive the energy-replenishing command from the cloud energy replenishing station server apparatus, unlock the energy replenishing nozzle to execute the energy replenishing service according to the energy-replenishing command, generate the energy-replenishing-service-completed command, and transmit the energy-replenishing-service-completed command; and an energy replenishing apparatus connection unit electrically coupled with the fourth data processing unit, configured to provide the internet connection.

* * * * *